(12) United States Patent
Mitchell, Jr.

(10) Patent No.: US 12,484,464 B2
(45) Date of Patent: Dec. 2, 2025

(54) SYSTEMS AND METHODS FOR PREPARING A FIELD FOR PLANTING

(71) Applicant: Douglas Kyle Mitchell, Jr., Corinth, MS (US)

(72) Inventor: Douglas Kyle Mitchell, Jr., Corinth, MS (US)

(*) Notice: Subject to any disclaimer, the term of this patent is extended or adjusted under 35 U.S.C. 154(b) by 796 days.

(21) Appl. No.: 17/750,894

(22) Filed: May 23, 2022

(65) Prior Publication Data

US 2023/0345851 A1    Nov. 2, 2023

Related U.S. Application Data

(60) Provisional application No. 63/337,477, filed on May 2, 2022.

(51) Int. Cl.
| | |
|---|---|
| *A01B 49/02* | (2006.01) |
| *A01B 33/02* | (2006.01) |
| *A01B 33/10* | (2006.01) |

(52) U.S. Cl.
CPC .......... *A01B 49/027* (2013.01); *A01B 33/024* (2013.01); *A01B 33/103* (2013.01)

(58) Field of Classification Search
CPC ..... A01B 33/12; A01B 33/024; A01B 33/103; A01B 15/02; A01B 79/02; A01B 49/02; A01B 35/18; A01B 21/08; A01B 49/00; A01B 49/027

See application file for complete search history.

(56) References Cited

U.S. PATENT DOCUMENTS

| | | | | |
|---|---|---|---|---|
| 2,161,705 | A * | 6/1939 | Haines | A01B 21/08 172/599 |
| 4,538,689 | A * | 9/1985 | Dietrich, Sr. | A01B 49/02 172/700 |
| 4,542,793 | A * | 9/1985 | Dietrich, Sr. | A01B 49/02 172/468 |
| 5,020,604 | A * | 6/1991 | Peck | A01B 49/027 172/551 |
| 6,554,078 | B1 * | 4/2003 | McDonald | A01B 49/027 172/73 |

(Continued)

OTHER PUBLICATIONS

Case IH Webpage "Disk Rippers;" https://url.emailprotection.link/?bS69IYVmx8NZ0fxT9lr0emBhUEF5QGfUeFtUwjECPX6kSTKSqlisMcG_cahEAC5f1d19KjU1em6ieVjkZq0OkYG1P-kPQsoXBZArXuqkTLf8_v3FewADEN4rohTMFZYR.

(Continued)

*Primary Examiner* — Jamie L McGowan
(74) *Attorney, Agent, or Firm* — McClure, Qualey & Rodack, LLP

(57) ABSTRACT

A representative system for preparing a field for planting includes: first disk blades, each exhibiting a first offset angle with respect to a tilling direction; second blades, each exhibiting a second offset angle with respect to the tilling direction; ripper shanks disposed behind the second disk blades; third disk blades disposed behind the ripper shanks, each exhibiting a third offset angle with respect to the tilling direction; fourth disk blades, each exhibiting a fourth offset angle with respect to the tilling direction; and a chopper reel disposed behind the fourth disk blades; wherein, with respect to magnitude, each of the first offset angle and the second offset angle is greater than each of the third offset angle and the fourth offset angle.

18 Claims, 5 Drawing Sheets

(56) References Cited

U.S. PATENT DOCUMENTS

| | | | | |
|---|---|---|---|---|
| 6,578,642 B2* | 6/2003 | Cox | ............... | A01B 63/32 |
| | | | | 172/624.5 |
| 7,017,675 B2* | 3/2006 | Ankenman | ............... | A01B 49/02 |
| | | | | 172/178 |
| 8,627,898 B2* | 1/2014 | Nance | ............... | A01B 23/06 |
| | | | | 172/186 |
| 9,313,937 B2* | 4/2016 | Gray | ............... | A01B 21/083 |
| 9,398,737 B2* | 7/2016 | Achten | ............... | A01B 5/04 |
| 9,723,776 B2* | 8/2017 | Sporrer | ............... | A01B 29/048 |
| 10,834,862 B2* | 11/2020 | Ankenman | ............... | A01B 5/08 |
| 2004/0016554 A1* | 1/2004 | McDonald | ............... | A01B 49/027 |
| | | | | 172/146 |
| 2006/0021768 A1* | 2/2006 | Ankenman | ............... | A01B 49/02 |
| | | | | 172/178 |
| 2013/0199807 A1* | 8/2013 | Hoffman | ............... | A01B 5/04 |
| | | | | 172/1 |
| 2014/0262363 A1* | 9/2014 | Gray | ............... | A01B 5/08 |
| | | | | 172/395 |
| 2016/0044856 A1* | 2/2016 | Janelle | ............... | A01B 21/08 |
| | | | | 172/574 |
| 2016/0044857 A1* | 2/2016 | Sporrer | ............... | A01B 63/32 |
| | | | | 172/140 |
| 2018/0049361 A1* | 2/2018 | Zemenchik | ............... | A01B 63/28 |
| 2018/0206393 A1* | 7/2018 | Stoller | ............... | A01B 33/16 |
| 2019/0059197 A1* | 2/2019 | Ankenman | ............... | A01B 49/027 |
| 2022/0210963 A1* | 7/2022 | Maas | ............... | A01B 19/02 |
| 2023/0345851 A1* | 11/2023 | Mitchell, Jr. | ............... | A01B 33/12 |
| 2025/0122933 A1* | 4/2025 | Jennen | ............... | F16H 61/16 |

OTHER PUBLICATIONS

John Deere Webpage "2730 Combination Ripper;" https://url.emailprotection.link/?bnXAomdD52WpTTys2ayaeAdc-8-9wD6ozQyNr10AjWFhVd2J4JvmKPmSG4b8eBPIQk2wZbfrQ8odHDpufzEUy6wKWUlbD4MGc3w-z46x1nsP1jxcHBzVdgp-AZLa2vZ29.
Great Plains Webpage "Max-Chisel;" https://www.greatplainsag.com/en/products/9641/max-chisel%E2%84%A2.

* cited by examiner

SYSTEMS AND METHODS FOR PREPARING A FIELD FOR PLANTING

CROSS REFERENCE TO RELATED APPLICATION

This utility patent application claims the benefit of and priority to U.S. Provisional Application 63/337,477, filed on May 2, 2022, the entirety of which is incorporated herein by reference.

BACKGROUND

Field of the Disclosure

The present disclosure generally relates to agriculture and, more specifically, to systems and methods for preparing fields for planting.

Description of the Related Art

Although farming has existed for millennia, significant advances in farming productivity due to industrialization have only been practiced for a little over one hundred years. Even with such advances, costs for farming can be a limiting factor as the cost of equipment and fuel to run the equipment can oftentimes outpace the ability to generate profit. Additionally, owing to the harsh conditions in which precision farming equipment operates, excessive costs may be associated with maintaining desired operating tolerances such as by replacing wear components. Environmental factors contribute to these financial stresses, as significant rain events in combination with prolonged droughts tend to create uneven terrain features that may cause excessive wear on equipment.

The following is presented to address one or more of the aforementioned, and potentially other, perceived shortcomings of the prior art.

SUMMARY

An example embodiment of a system for preparing a field for planting comprises: a frame configured to be drawn over a field in a tilling direction; a first row of disk blades mounted to the frame and oriented transverse to the tilling direction, each of the disk blades of the first row of disk blades extending beneath the frame to engage soil of the field, and each of the disk blades of the first row of disk blades exhibiting a first offset angle with respect to the tilling direction; a second row of disk blades mounted to the frame and oriented transverse to the tilling direction, the second row of disk blades being disposed behind the first row of disk blades with respect to the tilling direction, each of the disk blades of the second row of disk blades extending beneath the frame to engage soil of the field, and each of the disk blades of the second row of disk blades exhibiting a second offset angle with respect to the tilling direction; a row of ripper shanks mounted to the frame and oriented transverse to the tilling direction, the row of ripper shanks being disposed behind the second row of disk blades with respect to the tilling direction, each of the ripper shanks of the row of ripper shanks extending beneath the frame to engage soil of the field; a third row of disk blades mounted to the frame and oriented transverse to the tilling direction, the third row of disk blades being disposed behind the row of ripper shanks with respect to the tilling direction, each of the disk blades of the third row of disk blades extending beneath the frame to engage soil of the field, and each of the disk blades of the third row of disk blades exhibiting a third offset angle with respect to the tilling direction; a fourth row of disk blades mounted to the frame and oriented transverse to the tilling direction, the fourth row of disk blades being disposed behind the third row of disk blades with respect to the tilling direction, each of the disk blades of the fourth row of disk blades extending beneath the frame to engage soil of the field, and each of the disk blades of the fourth row of disk blades exhibiting a fourth offset angle with respect to the tilling direction; and a chopper reel mounted to the frame and oriented transverse to the tilling direction, the chopper reel being disposed behind the fourth row of disk blades with respect to the tilling direction, the chopper reel having chopper blades configured to rotate about a chopper blade rotational axis oriented transverse to the tilling direction; wherein, with respect to magnitude, each of the first offset angle and the second offset angle is greater than each of the third offset angle and the fourth offset angle.

In some embodiments, the row of ripper shanks is a first row of ripper shanks; and the system further comprises a second row of ripper shanks mounted to the frame and oriented transverse to the tilling direction, the second row of ripper shanks being disposed behind the first row of ripper shanks with respect to the tilling direction, each of the ripper shanks of the second row of ripper shanks extending beneath the frame to engage soil of the field.

In some embodiments, each of the ripper shanks of the second row of ripper shanks is laterally offset from a corresponding one of the ripper shanks of the first row of ripper shanks with respect to the tilling direction.

In some embodiments, each of the ripper shanks is configured to penetrate the soil and disrupt soil compaction.

In some embodiments, each of the ripper shanks is adjustably mounted to the frame to provide selectable adjustability of an associated working depth.

In some embodiments, the second offset angle mirrors the first offset angle with respect to the tilling direction.

In some embodiments, the fourth offset angle mirrors the third offset angle with respect to the tilling direction.

In some embodiments, each of the first offset angle and the second offset angle is between 15 and 20 degrees.

In some embodiments, each of the third offset angle and the fourth offset angle is between 8 and 12 degrees.

In some embodiments, each of the first offset angle and the second offset angle is 20 degrees.

In some embodiments, each of the third offset angle and the fourth offset angle is 12 degrees.

In some embodiments, the chopper reel is adjustably mounted to the frame; and a positioning assembly, mounted to the frame, configured to adjust a position of the chopper reel relative to the frame.

Another example embodiment of a system for preparing a field for planting comprises: a first plurality of disk blades oriented transverse to a tilling direction, each of the disk blades of the first plurality exhibiting a first offset angle with respect to the tilling direction; a second plurality of disk blades oriented transverse to the tilling direction, the second plurality of disk blades being disposed behind the first plurality of disk blades with respect to the tilling direction, each of the disk blades of the second plurality of disk blades exhibiting a second offset angle with respect to the tilling direction; a plurality of ripper shanks oriented transverse to the tilling direction, the plurality of ripper shanks being disposed behind the second plurality of disk blades with respect to the tilling direction; a third row of disk blades mounted to the frame and oriented transverse to the tilling direction, the third plurality of disk blades being disposed behind the plurality of ripper shanks with respect to the tilling direction, each of the disk blades of the third plurality of disk blades exhibiting a third offset angle with respect to the tilling direction; a fourth plurality of disk blades oriented transverse to the tilling direction, the fourth plurality of disk blades being disposed behind the third plurality of disk blades with respect to the tilling direction, each of the disk blades of the fourth plurality of disk blades exhibiting a fourth offset angle with respect to the tilling direction; and a chopper reel oriented transverse to the tilling direction and disposed behind the fourth plurality of disk blades with respect to the tilling direction, the chopper reel having chopper blades configured to rotate about a chopper blade rotational axis oriented transverse to the tilling direction; wherein, with respect to magnitude, each of the first offset angle and the second offset angle is greater than each of the third offset angle and the fourth offset angle.

In some embodiments, each of the first plurality of disk blades, the first plurality of disk blades, the first plurality of disk blades, and the first plurality of disk blades is arranged in a corresponding row.

Another example embodiment of a system for preparing a field for planting comprises: first disk blades, each exhibiting a first offset angle with respect to a tilling direction; second blades, each exhibiting a second offset angle with respect to the tilling direction; ripper shanks disposed behind the second disk blades; third disk blades disposed behind the ripper shanks, each exhibiting a third offset angle with respect to the tilling direction; fourth disk blades, each exhibiting a fourth offset angle with respect to the tilling direction; and a chopper reel disposed behind the fourth disk blades; wherein, with respect to magnitude, each of the first offset angle and the second offset angle is greater than each of the third offset angle and the fourth offset angle.

An example embodiment of a method for preparing a field for planting comprises: providing an agricultural implement having: a frame configured to be drawn over a field in a tilling direction; a first row of disk blades mounted to the frame and oriented transverse to the tilling direction, each of the disk blades of the first row of disk blades extending beneath the frame to engage soil of the field, and each of the disk blades of the first row of disk blades exhibiting a first offset angle with respect to the tilling direction; a second row of disk blades mounted to the frame and oriented transverse to the tilling direction, the second row of disk blades being disposed behind the first row of disk blades with respect to the tilling direction, each of the disk blades of the second row of disk blades extending beneath the frame to engage soil of the field, and each of the disk blades of the second row of disk blades exhibiting a second offset angle with respect to the tilling direction; a row of ripper shanks mounted to the frame and oriented transverse to the tilling direction, the row of ripper shanks being disposed behind the second row of disk blades with respect to the tilling direction, each of the ripper shanks of the row of ripper shanks extending beneath the frame to engage soil of the field; a third row of disk blades mounted to the frame and oriented transverse to the tilling direction, the third row of disk blades being disposed behind the row of ripper shanks with respect to the tilling direction, each of the disk blades of the third row of disk blades extending beneath the frame to engage soil of the field, and each of the disk blades of the third row of disk blades exhibiting a third offset angle with respect to the tilling direction; a fourth row of disk blades mounted to the frame and oriented transverse to the tilling direction, the fourth row of disk blades being disposed behind the third row of disk blades with respect to the tilling direction, each of the disk blades of the fourth row of disk blades extending beneath the frame to engage soil of the field, and each of the disk blades of the fourth row of disk blades exhibiting a fourth offset angle with respect to the tilling direction; and a chopper reel mounted to the frame and oriented transverse to the tilling direction, the chopper reel being disposed behind the fourth row of disk blades with respect to the tilling direction, the chopper reel having chopper blades configured to rotate about a chopper blade rotational axis oriented transverse to the tilling direction; wherein, with respect to magnitude, each of the first offset angle and the second offset angle is greater than each of the third offset angle and the fourth offset angle; and drawing the agricultural implement over a field in the tilling direction, wherein: the first row of disk blades and the second row of disk blades cut and bury field residue in the soil, redistribute the soil to fill in tire ruts, and loosen topsoil ahead of the row of ripper shanks; the row of ripper shanks disrupt soil compaction; the third row of disk blades and the fourth row of disk blades redistribute the soil to fill in trenches formed by the row of ripper shanks, cut soil masses brought to the surface by the row of ripper shanks, and level the soil ahead of the chopping reel; and the chopping reel mixes the field residue located at the surface of the field and levels the surface of the field.

In some embodiments, drawing the agricultural implement over the field is accomplished in a single pass with little to no overlap between adjacent runs.

In some embodiments, drawing the agricultural implement over the field further comprises adjusting a position of the chopper reel relative to the frame.

In some embodiments, the method further comprises setting a working depth associated with each of the ripper shanks prior to drawing the agricultural implement over the field.

In some embodiments, the method further comprises setting an offset angle for each of the disk blades prior to drawing the agricultural implement over the field.

Another example embodiment of a method for preparing a field for planting comprises: using a first row of disk blades and a second row of disk blades to cut and bury field residue in soil of a field, redistribute the soil to fill in tire ruts, and loosen topsoil; using a row of ripper shanks to disrupt soil compaction of the soil; using a third row of disk blades and a fourth row of disk blades to redistribute the soil to fill in trenches formed by the row of ripper shanks, cut soil masses brought to the surface by the row of ripper shanks, and level the soil; and using a chopping reel to mix the field residue located at the surface of the field and level the soil; wherein the first row of disk blades, the second row of disk blades, the row of ripper shanks, the third row of disk blades, the fourth row of disk blades, and the chopping reel are mounted to a frame.

In some embodiments, using of the first row of disk blades, the second row of disk blades, the row of ripper shanks, the third row of disk blades, the fourth row of disk blades, and the chopping reel further comprises pulling the frame over the field in a tilling direction; and the first row of disk blades, the second row of disk blades, the row of ripper shanks, the third row of disk blades, the fourth row of disk blades, and the chopping reel are disposed transversely to the tilling direction.

In some embodiments, the method further comprises seeding the field after pulling the frame over the field in the tilling direction.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
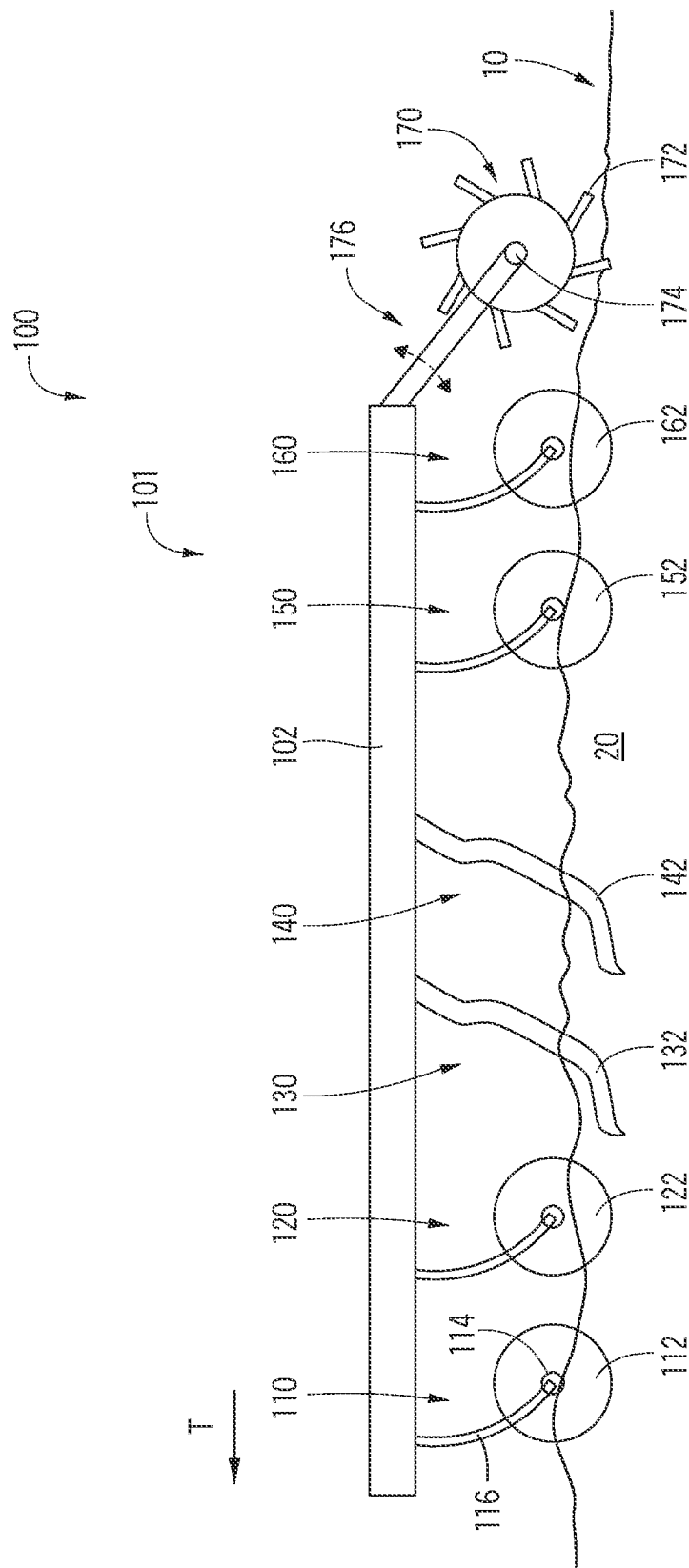
FIG. 1 is a schematic view of an example embodiment of a system for preparing a field for planting.

Reference will now be made in detail to the description of the disclosure as illustrated in the drawings. While the disclosure will be described in connection with these drawings, there is no intent to limit it to the embodiments disclosed herein.

As will be described, a system and/or method for preparing a field for planting may provide one or more improvements over the prior art, such as by facilitating field preparation for seeding in a single pass per area processed, for example. In some embodiments, various functions associated with preparing a field are accomplished by a single agricultural implement that is configured for drawing (for example, pulling) over the field. In this manner, fuel may be saved when compared to the use of multiple implements, with each requiring its own pass over the same area. Additionally, or alternatively, a system and/or method may involve leveling the soil as a later (for example, last) preparation step, which leaves the field in a desirable condition for precision farming equipment that may be negatively impacted by uneven terrain. However, even if another pass is needed, the soil preparation provided may facilitate use of a secondary tillage tool that may be simpler to operate and require less skilled labor. Stated differently, in some embodiments, a primary deep-tillage pass may be provided that will break up compaction and reset the soil profile, as well as leave the field prepared for seed. However, if a second pass is needed, a secondary tillage tool, such as a vertical tillage tool or spike tooth harrow, for example, may be used. So provided, the need for a field cultivator and/or horizontal tillage tool may be reduced or even eliminated. Horizontal tillage tools tend to be expensive to operate due to high wear parts that require replacement and skilled labor to monitor, set, operate and maintain these tools, such as in replacing the high wear parts (e.g., sweeps) and leveling tines.

Figure 2:
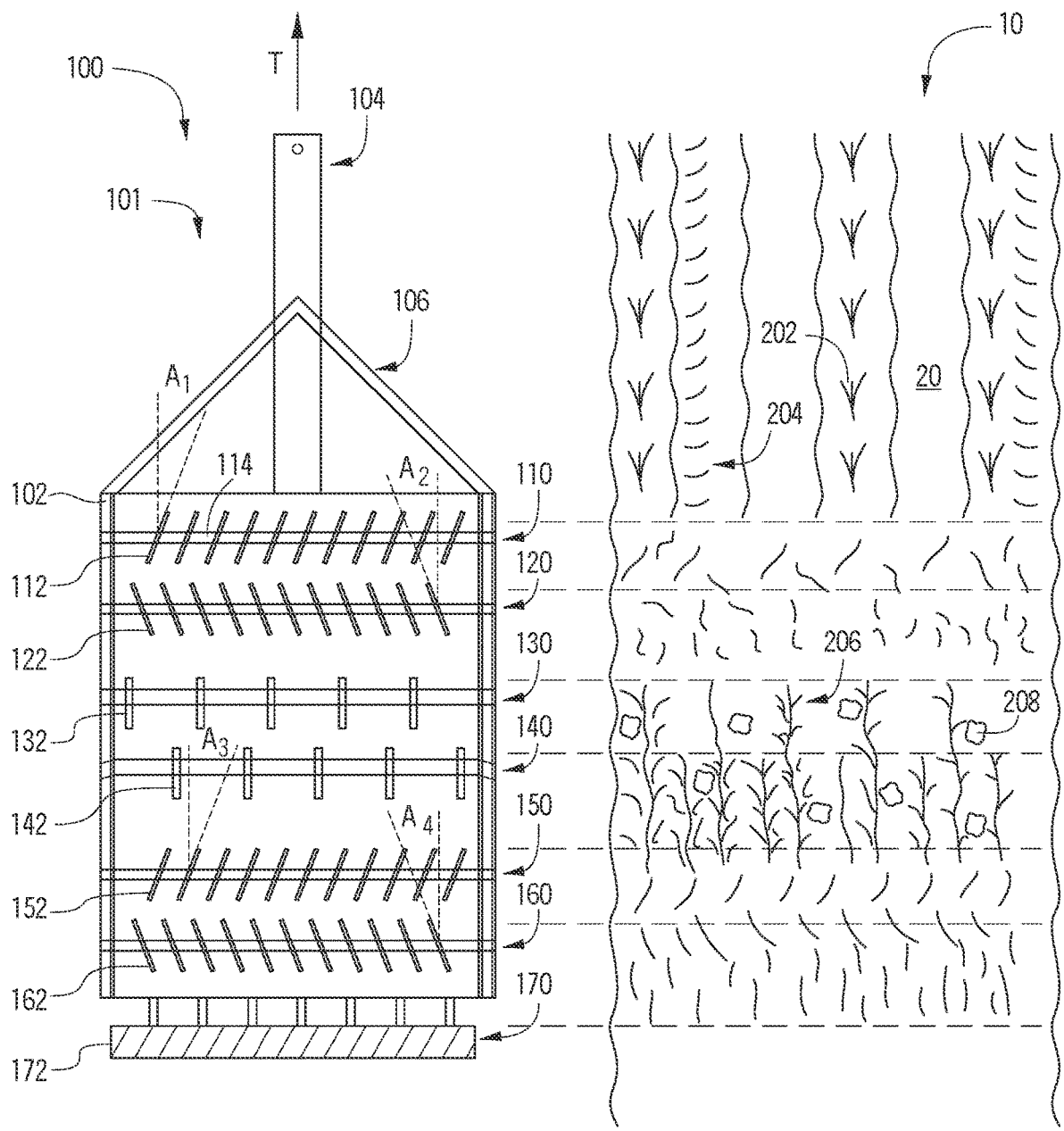
FIG. 2 is a schematic, plan view of the embodiment of FIG. 1.

An example embodiment of a system for preparing a field for planting is shown in FIGS. 1 and 2. System 100 incorporates an agricultural implement 101 with a frame 102 that is configured to be drawn over a field 10 in a tilling direction (identified by arrow T) such as by a tractor (not shown). A hitch assembly 104 and associated framing component 106 are disposed at the front of agricultural implement 101 (shown in FIG. 2).

A first row 110 of disk blades (26 inch diameter disk blades, for example) is mounted to frame 102 with first row 110 being oriented transverse to the tilling direction. Each of the disk blades of first row 110 (e.g., disk blade 112) extends beneath frame 102 to engage soil 20 of the field. An example configuration for mounting the disk blades includes a central axle 114 that is retained in position by mounting arms (e.g., mounting arm 116). As best shown in FIG. 2, each of the disk blades of first row 110 exhibits a first offset angle ($A_1$) with respect to the tilling direction. In some embodiments, the first offset angle ($A_1$) is set to be relatively aggressive. In some embodiments, the first offset angle ($A_1$) is between 15 and 20 degrees, and in some embodiments is +20 degrees (with "+" denoting clockwise from the tilling direction in plan view).

A second row 120 of disk blades is mounted to frame 102 with second row 120 being disposed behind first row 110 with respect to the tilling direction. Second row 120 is oriented transverse to the tilling direction, with each of the disk blades of second row 120 (e.g., disk blade 122) extending beneath frame 102 to engage soil 20. Each of the disk blades of second row 120 exhibits a second offset angle ($A_2$) with respect to the tilling direction. In some embodiments, the second offset angle ($A_2$) is between 15 and 20 degrees, and in some embodiments is −20 degrees (with "−" denoting counterclockwise from the tilling direction in plan view). In some embodiments, the first offset angle ($A_1$) and the second offset angle ($A_2$) mirror each other with respect to the tilling direction.

In some embodiments, disk blades of first row 110 are laterally offset (with respect to the tilling direction) from disk blades of second row 120. Lateral spacing between adjacent disk blades of a row may vary; however, spacing of 12 inches between adjacent disk blades of a row may be preferred. In some embodiments, the disk blades of rows 110 and 120 may exhibit a maximum working depth of 6 inches.

A first row 130 of ripper shanks is mounted to frame 102 and disposed behind second row 120 of disk blades with respect to the tilling direction. First row 130 is oriented transverse to the tilling direction, with each of the ripper shanks (e.g., ripper shank 132) extending beneath frame 102 to engage soil of the field. In some embodiments, working depths of the ripper shanks are adjustable. By way of example, each of the ripper shanks may be adjustably mounted to frame 102 to provide selectable adjustability of an associated working depth, which may be between 10-18 inches in some embodiments.

In some embodiments, agricultural implement 101 incorporates a second row 140 of ripper shanks disposed behind first row 130 of ripper shanks. Each of the ripper shanks of second row 140 (e.g., ripper shank 142) extending beneath frame 102 to engage soil of the field and may be configured to provide adjustable working depths.

In some embodiments, ripper shanks of first row 130 are laterally offset (with respect to the tilling direction) of ripper shanks of second row 140. Lateral spacing between adjacent ripper shanks of a row may vary; however, spacing of 40 inches between adjacent ripper shanks of a row may be preferred.

A third row 150 of disk blades is mounted to frame 102 with third row 150 being oriented transverse to the tilling direction. Each of the disk blades of third row 150 (e.g., disk blade 152) extends beneath frame 102 to engage soil of the field. Each of the disk blades of third row 150 exhibits a third offset angle ($A_3$) with respect to the tilling direction. In some embodiments, the third offset angle ($A_3$) is lesser in magnitude than each of the first offset angle ($A_1$) and the second offset angle ($A_2$). In some embodiments, the third offset angle ($A_3$) is between 8 and 12 degrees, and in some embodiments is +12 degrees.

A fourth row 160 of disk blades is mounted to frame 102 with fourth row 160 being disposed behind third row 150 with respect to the tilling direction. Fourth row 160 is oriented transverse to the tilling direction, with each of the disk blades of fourth row 160 (e.g., disk blade 162) extending beneath frame 102 to engage soil 20. Each of the disk blades of fourth row 160 exhibits a second offset angle ($A_4$) with respect to the tilling direction. In some embodiments, the fourth offset angle ($A_4$) is lesser in magnitude than each of the first offset angle ($A_1$) and the second offset angle ($A_2$). In some embodiments, the fourth offset angle ($A_4$) is between 8 and 12 degrees, and in some embodiments is −12 degrees. In some embodiments, the third offset angle ($A_3$) and the fourth offset angle ($A_4$) mirror each other with respect to the tilling direction.

In some embodiments, disk blades of third row 150 are laterally offset (with respect to the tilling direction) from disk blades of fourth row 160. Lateral spacing between adjacent disk blades of a row may vary; however, spacing of 12 inches between adjacent disk blades of a row may be preferred. In some embodiments, the disk blades of rows 150 and 160 may exhibit a maximum working depth of 6 inches.

A chopper reel 170 is mounted to frame 102 behind fourth row 160 and oriented transverse to the tilling direction. Chopper reel 170 incorporates chopper blades (e.g., chopper blade 172) that are configured to rotate about a chopper blade rotational axis 174, which is oriented transverse to the tilling direction. In some embodiments, a position of chopper reel 170 may be adjustable relative to frame 102. By way of example, chopper reel may be mounted to frame 102 via a positioning assembly 176 that selectively sets a working height of the chopper blades by applying downward pressure to the chopper reel. In operation, as chopper reel 170 rolls across the ground, the chopper blades rotate about chopper blade rotational axis 174 to chop clods and leftover surface residue, and level the soil to give a better seed bed.

System 100 is shown in operation in FIG. 2, which depicts agricultural implement 101 being drawn over a field, with the field underneath agricultural implement 101 being laterally offset to the right of the figure for ease of illustration. In operation, as agricultural implement 101 is drawn over field 10, disk blades of first row 110 and second row 120 cut and bury field residue (e.g., residue 202) in the soil, redistribute the soil to fill in ruts (e.g., tire rut 204), and loosen topsoil. Continued movement along the tiling direction causes the ripper shanks of rows 130 and 140 to disrupt soil compaction. Engagement with the soil by the disk blades of third row 150 and fourth row 160 redistributes the soil to fill in trenches (e.g., trench 206) formed by the ripper shanks, cuts soil masses (e.g., mass 208) brought to the surface by the ripper shanks, and levels the soil. Then, chopping reel 170 mixes the field residue located at the surface of the field and levels the surface of the field.

Figure 3:
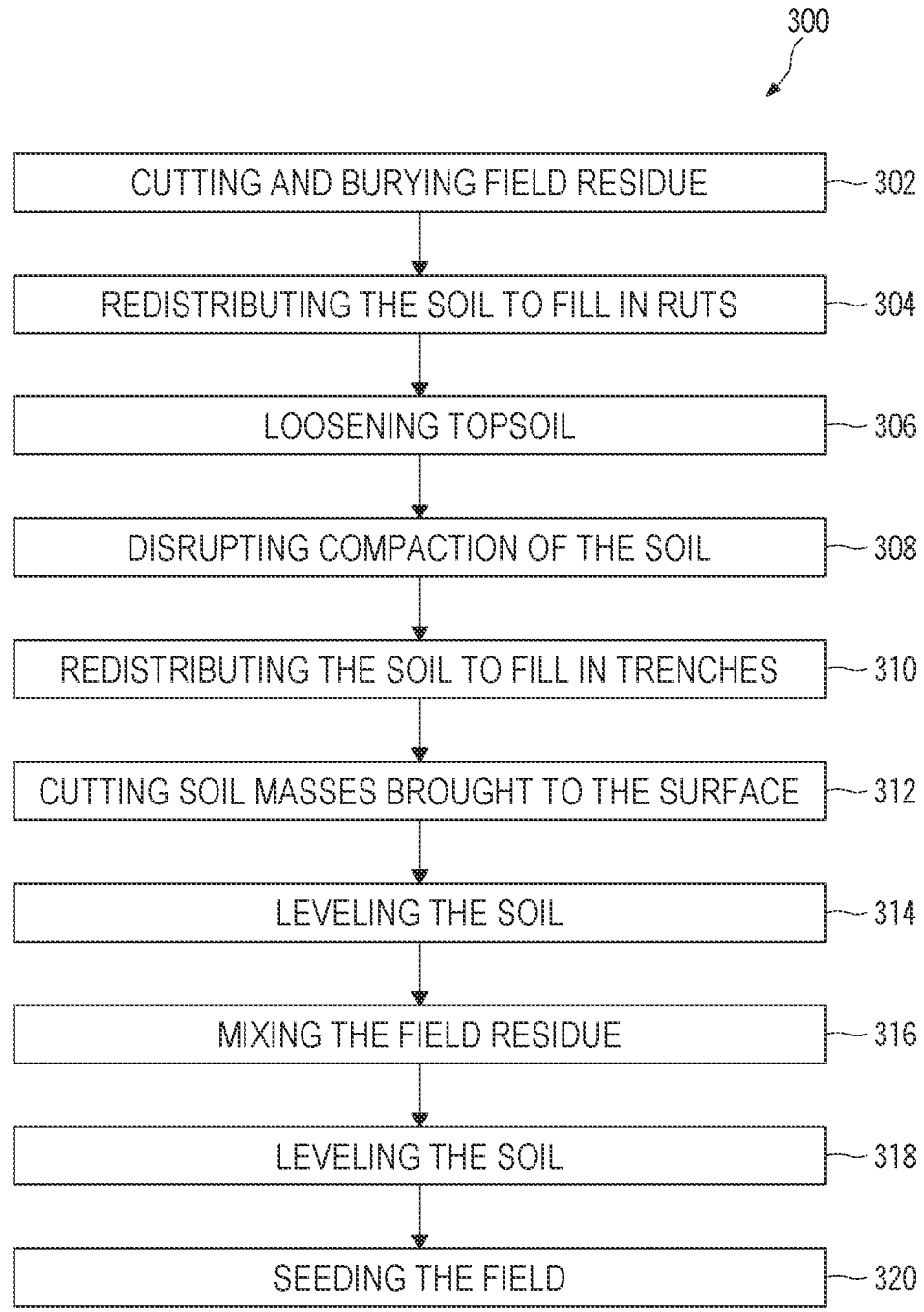
FIG. 3 is a flowchart depicting an example embodiment of a method for preparing a field for planting.

An example embodiment of a method for preparing a field for planting will now be described with respect to the flowchart of FIG. 3. As shown in FIG. 3, the method 300 may be construed as beginning at block 302, in which field residue is cut and buried in soil of a field. In block 304, the soil is redistributed to fill in ruts. Then, in block 306, topsoil is loosened. In some embodiments, the functions associated with blocks 302, 304 and 306 may be performed by a plurality of disk blades with a relatively aggressive disk blade offset angle with respect to a tilling direction. In some embodiments, the plurality of disk blades may be arranged in one or more rows.

In block 308, soil compaction is disrupted. In some embodiments, this may be accomplished by a plurality of ripper shanks. In some embodiments, the plurality of ripper shanks may be arranged in one or more rows.

In block 310, the soil is redistributed to fill in trenches and then (as shown in block 312) soil masses brought to the surface are cut. In block 314, the soil is leveled (i.e., any existing un-level condition of the soil is reduced). In some embodiments, the functions associated with blocks 310, 312 and 314 may be performed by a plurality of disk blades with a blade offset angle that is relatively less aggressive with respect to a tilling direction than the offset angle associated with the disk blades described above as corresponding to blocks 302, 304 and 306.

As depicted in blocks 316 and 318, respectively, field residue located at the surface of the field is mixed, and the soil is leveled. In some embodiments, these functions may be accomplished by a chopper reel. Thereafter, such as depicted in bock 320, the field may be seeded.

It should be noted that, in some embodiments, one or more of the aforementioned functions may be performed by an agricultural implement that is drawn over the field a single pass with little to no overlap between adjacent runs. When an agricultural implement is used, one or more of various adjustments may be made prior to use to accommodate field conditions, such as setting offset angles for the disk blades, setting working depths for the ripper shanks, and adjusting a position of the chopper reel, for example.

Figure 4:
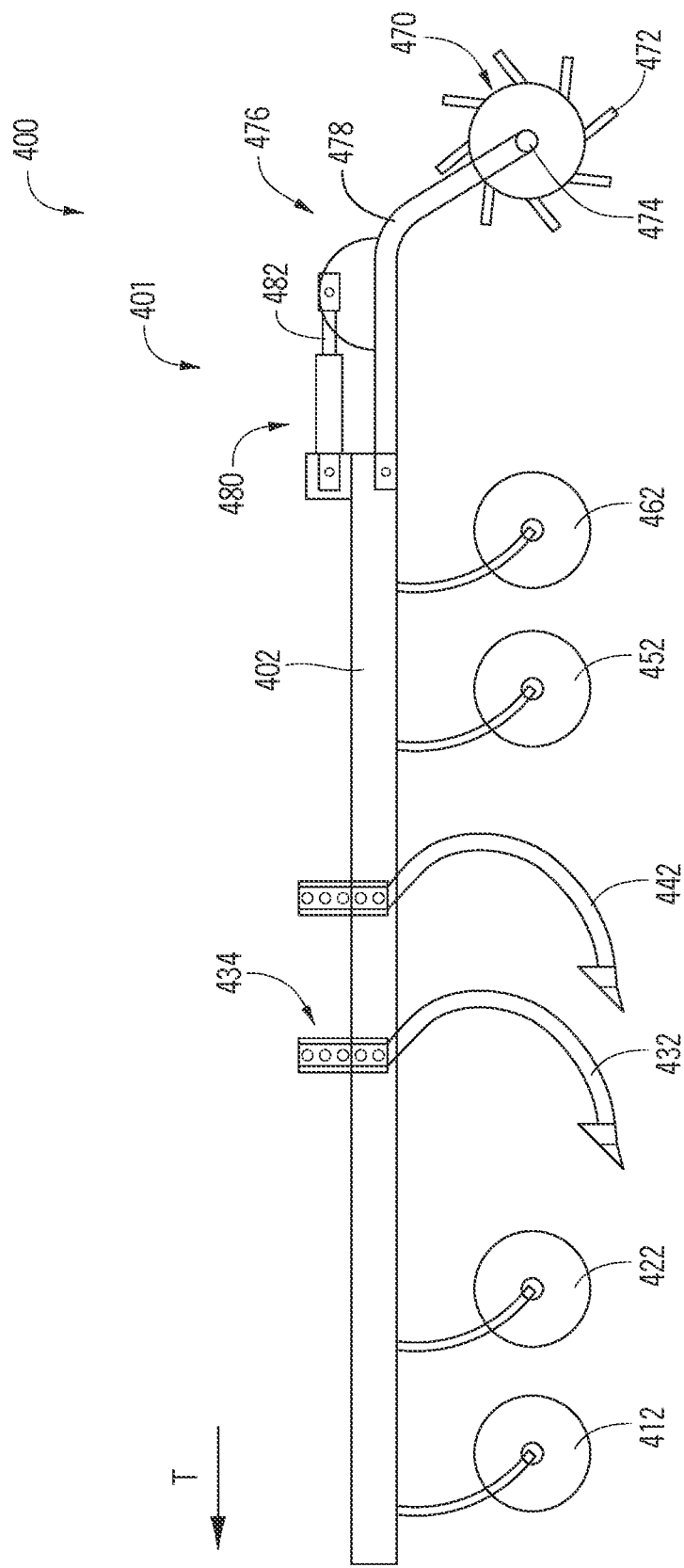
FIG. 4 is a schematic view of another example embodiment of a system for preparing a field for planting.
Figure 5:
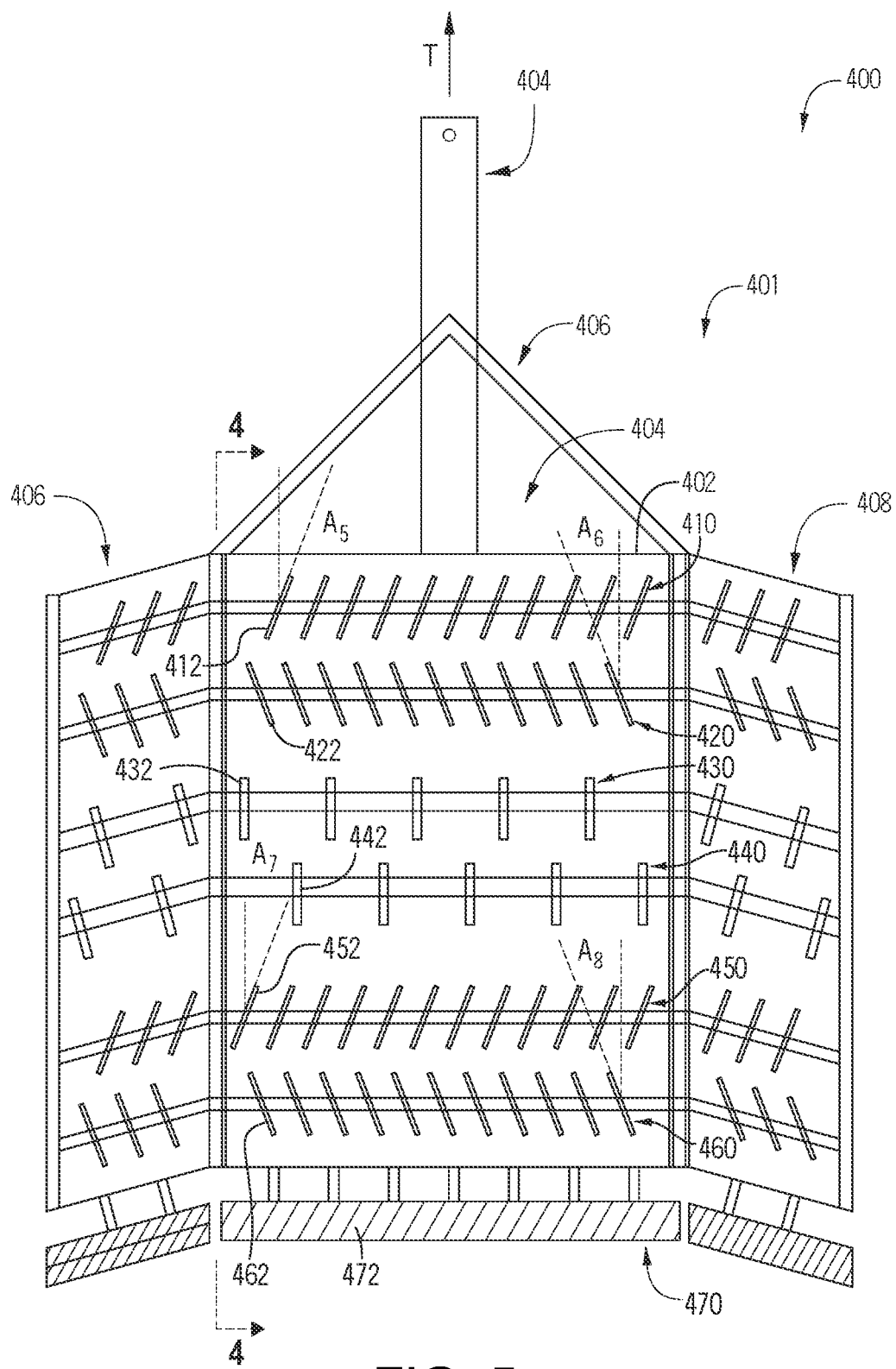
FIG. 5 is a schematic, plan view of the embodiment of FIG. 4.

Another example embodiment of a system for preparing a field for planting is shown in FIGS. 4 and 5. System 400 incorporates an agricultural implement 401 with a frame 402 that is configured to be drawn over a field in a tilling direction (identified by arrow T) such as by a tractor (not shown). A hitch assembly 404 and associated framing component 406 are disposed at the front of agricultural implement 401 (shown in FIG. 5).

A first row 410 of disk blades is mounted to frame 402 with first row 410 being oriented transverse to the tilling direction. Each of the disk blades of first row 410 (e.g., disk blade 412) extends beneath frame 402 to engage soil of the field. As best shown in FIG. 5, each of the disk blades of first row 410 exhibits a first offset angle ($A_5$) with respect to the tilling direction. In some embodiments, the first offset angle ($A_5$) is between 15 and 20 degrees, and in some embodiments is +20 degrees.

A second row 420 of disk blades is mounted to frame 402 with second row 420 being disposed behind first row 410 with respect to the tilling direction. Second row 120 is oriented transverse to the tilling direction, with each of the disk blades of second row 420 (e.g., disk blade 422) extending beneath frame 402 to engage soil. Each of the disk blades of second row 420 exhibits a second offset angle ($A_6$) with respect to the tilling direction. In some embodiments, the second offset angle ($A_6$) is between 15 and 20 degrees, and in some embodiments is −20 degrees. In some embodiments, the first offset angle ($A_5$) and the second offset angle ($A_6$) mirror each other with respect to the tilling direction. In some embodiments, disk blades of second row 420 are laterally offset (with respect to the tilling direction) from disk blades of first row 410.

A first row 430 of ripper shanks is mounted to frame 402 and disposed behind second row 420 of disk blades with respect to the tilling direction. First row 430 is oriented transverse to the tilling direction, with each of the ripper shanks (e.g., ripper shank 432) extending beneath frame 402 to engage soil of the field. In some embodiments, working depths of the ripper shanks are individually adjustable. By way of example, each of the ripper shanks incorporates a mounting base (e.g., mounting base 434) with multiple fixing positions that engages a mounting fastener (e.g., a bolt (not shown)) to provide selectable adjustability of an associated working depth.

In some embodiments, agricultural implement 101 incorporates a second row 440 of ripper shanks disposed behind first row 430 of ripper shanks. Each of the ripper shanks of second row 440 (e.g., ripper shank 442) extending beneath frame 402 to engage soil of the field and may be configured to provide adjustable working depths (such as shown in FIG. 4).

In some embodiments, ripper shanks of first row 130 are laterally offset (with respect to the tilling direction) of ripper shanks of second row 140. Lateral spacing between adjacent ripper shanks of a row may vary; however, spacing of 40 inches between adjacent ripper shanks of a row may be preferred.

A third row 450 of disk blades is mounted to frame 402 with third row 450 being oriented transverse to the tilling direction. Each of the disk blades of third row 450 (e.g., disk blade 452) extends beneath frame 402 to engage soil of the field. Each of the disk blades of third row 450 exhibits a third offset angle ($A_7$) with respect to the tilling direction. In some embodiments, the third offset angle ($A_7$) is lesser in magnitude than each of the first offset angle ($A_5$) and the second offset angle ($A_6$). In some embodiments, the third offset angle ($A_7$) is between 8 and 12 degrees, and in some embodiments is +12 degrees.

A fourth row 460 of disk blades is mounted to frame 402 with fourth row 460 being disposed behind third row 450 with respect to the tilling direction. Fourth row 460 is oriented transverse to the tilling direction, with each of the disk blades of fourth row 460 (e.g., disk blade 462) extending beneath frame 402 to engage soil. Each of the disk blades of fourth row 460 exhibits a second offset angle ($A_8$) with respect to the tilling direction. In some embodiments, the fourth offset angle ($A_8$) is lesser in magnitude than each of the first offset angle ($A_5$) and the second offset angle ($A_6$). In some embodiments, the fourth offset angle ($A_8$) is between 8 and 12 degrees, and in some embodiments is −12 degrees. In some embodiments, the third offset angle ($A_7$) and the fourth offset angle ($A_8$) mirror each other with respect to the tilling direction. In some embodiments, disk blades of third row 450 are laterally offset (with respect to the tilling direction) from disk blades of fourth row 460.

A chopper reel 470 is mounted to frame 402 behind fourth row 460 and oriented transverse to the tilling direction. Chopper reel 470 incorporates chopper blades (e.g., chopper blade 472) that are configured to rotate about a chopper blade rotational axis 474, which is oriented transverse to the tilling direction. In some embodiments, a position of chopper reel 470 may be adjustable relative to frame 402. As shown in FIG. 4, chopper reel 470 is rotationally mounted to one end of an arm 478 of a positioning assembly 476. The other end of arm 478 is pivotally attached to frame 402, with an intermediate position of arm 478 being engaged by the adjusting arm 482 of an actuator 480 (e.g., a hydraulic actuator) that selectively sets a working height of the chopper blades. In operation, positioning assembly 476 urges chopper reel 470 downwardly to ensure and/or improve engagement with the soil.

In some embodiments, an agricultural implement may be configured with a multi-section frame with each section incorporating corresponding disk blades, ripper shanks and chopper reel. FIG. 5 depicts an example of such an embodiment, in which frame 402 includes main frame section 404, as well as side frame sections 406 and 408. In some embodiments, a side frame section may be hinged to a main frame section to permit retraction of the side frame section inwardly to reduce a working width of the agricultural implement (such as may be useful during road transport) and expansion to the configuration depicted (which provides enhanced width coverage for preparing a field). It should be noted that this, and other embodiments, may incorporate wheel/tire assemblies (not shown) that facilitate movement of the system when tilling is not desired during movement, such as during road transport, as would be understood to one of ordinary skill.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure.

What is claimed is:

1. A system for preparing a field for planting by breaking up soil compaction, the system comprising:
    a frame configured to be drawn over a field in a tilling direction;
    a first row of disk blades mounted to the frame and oriented transverse to the tilling direction, each of the disk blades of the first row of disk blades extending beneath the frame to engage soil of the field, and each of the disk blades of the first row of disk blades exhibiting a first offset angle with respect to the tilling direction;
    a second row of disk blades mounted to the frame and oriented transverse to the tilling direction, the second row of disk blades being disposed behind the first row of disk blades with respect to the tilling direction, each of the disk blades of the second row of disk blades extending beneath the frame to engage soil of the field, and each of the disk blades of the second row of disk blades exhibiting a second offset angle with respect to the tilling direction, the second offset angle mirroring the first offset angle with respect to the tilling direction;
    a row of ripper shanks mounted to the frame and oriented transverse to the tilling direction, the row of ripper shanks being disposed behind the second row of disk blades with respect to the tilling direction, each of the ripper shanks of the row of ripper shanks extending beneath the frame to engage soil of the field, each of the ripper shanks being configured to penetrate the soil and disrupt soil compaction;
    a third row of disk blades mounted to the frame and oriented transverse to the tilling direction, the third row of disk blades being disposed behind the row of ripper shanks with respect to the tilling direction, each of the disk blades of the third row of disk blades extending beneath the frame to engage soil of the field, and each of the disk blades of the third row of disk blades exhibiting a third offset angle with respect to the tilling direction;

a fourth row of disk blades mounted to the frame and oriented transverse to the tilling direction, the fourth row of disk blades being disposed behind the third row of disk blades with respect to the tilling direction, each of the disk blades of the fourth row of disk blades extending beneath the frame to engage soil of the field, and each of the disk blades of the fourth row of disk blades exhibiting a fourth offset angle with respect to the tilling direction, the fourth offset angle mirroring the third offset angle with respect to the tilling direction;

a chopper reel adjustably mounted to the frame and oriented transverse to the tilling direction, the chopper reel being disposed at a rearmost position behind the fourth row of disk blades with respect to the tilling direction, the chopper reel having chopper blades configured to rotate about a chopper blade rotational axis oriented transverse to the tilling direction to mix field residue located at a surface of the field and level the surface of the field while retaining decompaction of the soil; and a positioning assembly, mounted to the frame, having an actuator configured to apply downward pressure to adjust a position of the chopper reel relative to the frame to set a working depth of the chopper reel;

wherein, with respect to magnitude, each of the first offset angle and the second offset angle is greater than each of the third offset angle and the fourth offset angle.

2. The system of claim 1, wherein:
the row of ripper shanks is a first row of ripper shanks; and
the system further comprises a second row of ripper shanks mounted to the frame and oriented transverse to the tilling direction, the second row of ripper shanks being disposed behind the first row of ripper shanks with respect to the tilling direction, each of the ripper shanks of the second row of ripper shanks extending beneath the frame to engage soil of the field.

3. The system of claim 2, wherein each of the ripper shanks of the second row of ripper shanks is laterally offset from a corresponding one of the ripper shanks of the first row of ripper shanks with respect to the tilling direction.

4. The system of claim 1, wherein each of the ripper shanks is adjustably mounted to the frame to provide selectable adjustability of an associated working depth.

5. The system of claim 1, wherein each of the first offset angle and the second offset angle is between 15 and 20 degrees.

6. The system of claim 5, wherein each of the third offset angle and the fourth offset angle is between 8 and 12 degrees.

7. The system of claim 6, wherein each of the first offset angle and the second offset angle is 20 degrees.

8. The system of claim 7, wherein each of the third offset angle and the fourth offset angle is 12 degrees.

9. The system of claim 1, wherein:
the positioning system has an arm and an actuator;
the chopper reel is rotationally mounted to a first end of the arm;
the frame is pivotally attached to a second end of the arm; and
the actuator has an adjusting arm engaging an intermediate position of the arm, the actuator selectively setting the working height of the chopper by urging the chopper reel downwardly for engagement with the soil.

10. The system of claim 9, wherein the actuator is a hydraulic actuator.

11. A method for preparing a field for planting by breaking up soil compaction, the method comprising:
providing an agricultural implement having:
a frame configured to be drawn over a field in a tilling direction;
a first row of disk blades mounted to the frame and oriented transverse to the tilling direction, each of the disk blades of the first row of disk blades extending beneath the frame to engage soil of the field, and each of the disk blades of the first row of disk blades exhibiting a first offset angle with respect to the tilling direction;
a second row of disk blades mounted to the frame and oriented transverse to the tilling direction, the second row of disk blades being disposed behind the first row of disk blades with respect to the tilling direction, each of the disk blades of the second row of disk blades extending beneath the frame to engage soil of the field, and each of the disk blades of the second row of disk blades exhibiting a second offset angle with respect to the tilling direction;
a row of ripper shanks mounted to the frame and oriented transverse to the tilling direction, the row of ripper shanks being disposed behind the second row of disk blades with respect to the tilling direction, each of the ripper shanks of the row of ripper shanks extending beneath the frame to engage soil of the field, each of the ripper shanks being configured to penetrate the soil and disrupt soil compaction;
a third row of disk blades mounted to the frame and oriented transverse to the tilling direction, the third row of disk blades being disposed behind the row of ripper shanks with respect to the tilling direction, each of the disk blades of the third row of disk blades extending beneath the frame to engage soil of the field, and each of the disk blades of the third row of disk blades exhibiting a third offset angle with respect to the tilling direction;
a fourth row of disk blades mounted to the frame and oriented transverse to the tilling direction, the fourth row of disk blades being disposed behind the third row of disk blades with respect to the tilling direction, each of the disk blades of the fourth row of disk blades extending beneath the frame to engage soil of the field, and each of the disk blades of the fourth row of disk blades exhibiting a fourth offset angle with respect to the tilling direction;
a chopper reel adjustably mounted to the frame and oriented transverse to the tilling direction, the chopper reel being disposed at a rearmost position behind the fourth row of disk blades with respect to the tilling direction, the chopper reel having chopper blades configured to rotate about a chopper blade rotational axis oriented transverse to the tilling direction to mix field residue located at a surface of the field and level the surface of the field while retaining decompaction of the soil; and
a positioning assembly, mounted to the frame, having an actuator configured to apply downward pressure to adjust a position of the chopper reel relative to the frame to set a working depth of the chopper reel;
wherein, with respect to magnitude, each of the first offset angle and the second offset angle is greater than each of the third offset angle and the fourth offset angle; and
drawing the agricultural implement over a field in the tilling direction, wherein:

the first row of disk blades and the second row of disk blades cut and bury field residue in the soil, redistribute the soil to fill in tire ruts, and loosen topsoil ahead of the row of ripper shanks;

the row of ripper shanks disrupt soil compaction;

the third row of disk blades and the fourth row of disk blades redistribute the soil to fill in trenches formed by the row of ripper shanks, cut soil masses brought to the surface by the row of ripper shanks, and level the soil ahead of the chopping reel; and the chopping reel mixes the field residue located at the surface of the field and levels the surface of the field while retaining decompaction of the soil.

12. The method of claim 11, wherein drawing the agricultural implement over the field is accomplished in a single pass with little to no overlap between adjacent runs.

13. The method of claim 11, wherein drawing the agricultural implement over the field further comprises adjusting the position of the chopper reel relative to the frame with the positioning assembly to set the working depth of the chopper reel.

14. The method of claim 11, further comprising setting a working depth associated with each of the ripper shanks prior to drawing the agricultural implement over the field.

15. The method of claim 11, further comprising setting an offset angle for each of the disk blades prior to drawing the agricultural implement over the field.

16. The method of claim 11, further comprising seeding the field after drawing the agricultural implement over the field in the tilling direction.

17. The method of claim 11, wherein:

the positioning system has an arm and an actuator;

the chopper reel is rotationally mounted to a first end of the arm;

the frame is pivotally attached to a second end of the arm; and the actuator has an adjusting arm engaging an intermediate position of the arm; and the method further comprises using the actuator to selectively set the working height of the chopper by urging the chopper reel downwardly for engagement with the soil.

18. The method of claim 17, wherein the actuator is a hydraulic actuator.

* * * * *